Jan. 3, 1956     W. M. NICHOLS     2,729,205
FUEL CONTROL SYSTEM
Filed April 14, 1953
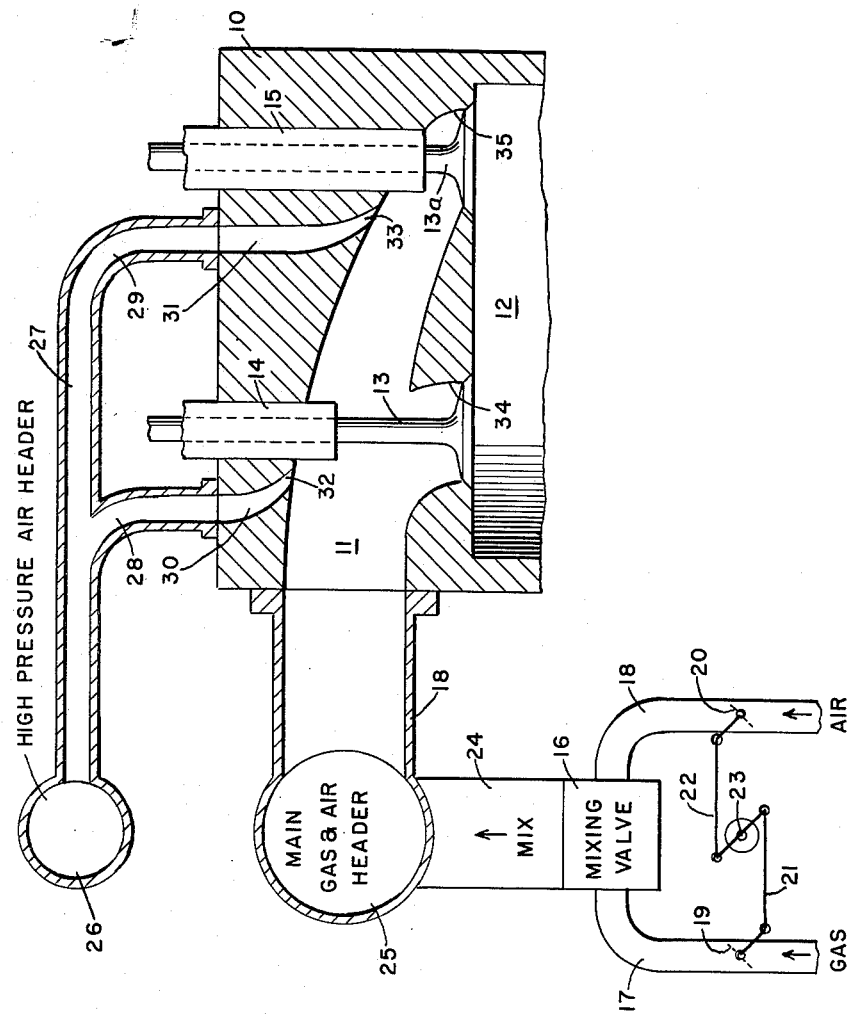
WILLIAM M. NICHOLS.
INVENTOR
BY *Maurice W. Grady*
ATTORNEY

United States Patent Office 2,729,205
Patented Jan. 3, 1956

2,729,205

FUEL CONTROL SYSTEM

William M. Nichols, Schenectady, N. Y., assignor to Alco Products, Inc., New York, N. Y., a corporation of New York Application April 14, 1953, Serial No. 348,793

5 Claims. (Cl. 123—120)

This invention relates to a fuel control system and particularly to such a system to control the mixing and delivery of the gas-air admixture to a dual fuel internal combustion engine.

When a dual fuel internal combustion engine of the compression ignition type is operating on gas, the admixture of gas and air delivered to the combustion chamber must be very accurately proportioned. On the curve of mixture ratio plotted against the rate of flame propagation, the permissible range of efficient operation for the engine on gas is a small proportion of the total curve. That is, the range of operation permissible is very critical. Many variables will take the proper ratio out of the critical range and adversely effect the operation of the engine. Atmospheric conditions, supercharger efficiency, and engine adjustments are constantly recurring variables and due consideration must be given to such variables in the design of any system which controls the mixing and delivery of gas and air to this type of engine so that operation is maintained within the critical range.

Another problem encountered when such engines operate on gas is the accumulation of a gas residue in the zone of the inlet passage adjacent the engine cylinder each time the inlet valve closes at the end of the suction stroke. Upon the subsequent opening of the inlet valve for scavenging, this gas residue is swept through the cylinder and out through the exhaust valve with the scavenging air and is of course wasted. A second disadvantage of such a gas residue is the danger of back firing if there is still flame in the cylinder when the inlet valve opens for scavenging.

One design for the prevention of the gas residue is illustrated in Patent #2,375,071 to Boyer. In this construction the air inlet valve opens before the gas inlet valve and closes after the gas valve closes. In the interval between the opening of the air and gas valves, pure air scavenges the combustion chamber. When the gas valve opens, the gas is entrained with the air and the admixture enters the combustion chamber where the exhaust valve has now closed. Then when the gas valve closes, the air which is still in supply sweeps the gas residue out of the inlet passage into the combustion chamber. No residue is left when the inlet valve closes. The objection to the Boyer design is that accurate proportioning of the gas and air in the admixture is impossible and a valve is required. The mixing takes place in the cylinder head and the most efficient air/fuel ratio (which frequently changes because of the aforementioned variables) cannot be supplied because the gas cannot "sense" the quantity of the air and adjust itself accordingly to maintain the best ratio and vice versa. Because the mixing is done purely by mechanical operation of the valves, the ratio is the same regardless of the variable conditions. Consequently, the elimination of the gas residue in Boyer is accomplished at the sacrifice of accurate control of the air/fuel ratio.

The principal object of the invention is to provide a new and efficient means of delivering the admixture of gas and air to a dual fuel internal combustion engine of the compression ignition type. Another object is to provide such means which prevents the waste of fuel during scavenging. Still another object is to avoid the formation of a residue of gas in the zone of the inlet passage adjacent the combustion chamber thus to prevent back firing. Another object is to provide means to avoid the formation of a gas residue in the zone of the inlet passage adjacent the combustion chamber thus to eliminate fuel waste during scavenging, such results being achieved in conjunction with the delivery, under all operating conditions, of an accurately proportioned gas-air admixture to the combustion chamber. Another object is to supply the same accurately proportioned gas-air admixture to all the cylinders. Other and further objects of the present invention will be apparent from the following description, the accompanying drawings, and the appended claims.

The drawing shows in cross section a cylinder head with two inlet valves having an inlet passage supplied by a gas-air mixture prepared by a mixing valve away from the head. A two-branched high pressure air header supplies air to the inlet passage in accordance with the invention. The exhaust valves and fuel injector for operation on oil are not shown.

In the drawing, cylinder head 10 is formed with an inlet passage 11 to supply an admixture of gas and air to the combustion chamber 12. Passage 11 is controlled by inlet valves 13 and 13a which are adapted to reciprocate in bushings 14 and 15 as actuated by conventional means such as rocker arms (not shown). Two inlet valves are shown since such an arrangement is most common in engines of the type described but the invention could be equally well applied if only one inlet valve were used.

The gas-air admixture is supplied to passage 11 in a predetermined ratio and at a predetermined pressure from mixing valve 16 which receives and mixes gas delivered through pipe 17 and air delivered through pipe 18. Sensing means to control the ratio of gas and air delivered to the mixing valve are diagrammatically illustrated. Dampers 19 and 20 are connected respectively to linkages 21 and 22 which are actuated by a rotatable shaft 23 associated with the governor (not shown). This arrangement for mixing the air and gas in accordance with the demands of the governor is not new and in itself forms no part of the present invention except that such an arrangement will "sense" the aforementioned variables and supply the proper air/fuel ratio under all conditions and its use and location in relation to other structure to be described forms part of the invented combination. From mixing valve 16 the admixture of gas and air advances through pipe 24 to header 25 which is common to all the cylinders whence it flows through inlet passage 11 to the combustion chamber, as controlled by valves 13 and 13a.

A second header 26 common to all the cylinders provides a continuous supply of pure air from another source, which may be a supercharger if the engine is so equipped, through manifold 27 and its two branches 28 and 29 into ducts 30 and 31 which are in communication with inlet passage 11. Such pure air is supplied at a pressure always greater than the pressure of the admixture supplied from headers 25. Nozzles 32 and 33 are formed at the ends of ducts 30 and 31 and are arranged preferably directed into the remote areas of the cylinder inlet ports 34 and 35. It is important to note that the nozzles 32 and 33 are throttling nozzles designed to admit air into passage 11 at a higher pressure but at a considerably lower rate than the admixture entering passage 11. If the engine should be designed to have only one inlet valve per cylinder, then only one port and nozzle would be required.

When valves 13 and 13a are closed, the pure air from header 26, being at a greater pressure than the admixture of gas and air from header 25 "dribbles" in and, because of its higher pressure, forces the admixture back away from the valves toward header 25. Consequently, at the time the valves open for scavenging, only pure air occupies the zone of the passageway adjacent the valves to present a firewall and prevent backfiring. As such pure air rushes into the combustion chamber, there is a drop in pressure in said zone sufficient to permit the gas and air admixture to follow the pure air into the combustion chamber because the pure air supply is exhausted faster than the slow rate nozzles can renew it. In the interval between the closing of the valves at the end of the suction stroke and their re-opening for scavenging (which is approximately 500° cycle time for the four stroke cycle cylinder illustrated), the high pressure air has sufficient time to build up a pressure again to force the admixture of gas and air back toward header 25. Hence no gas is permitted to remain in the zone adjacent the valves to pass into the combustion chamber when the valves open for scavenging. Since the nozzles are directed at the remote areas around the valves, any admixture remaining there after the valves close will be cleared away so that only pure air is present in the zone adjacent the valves when the latter opens for scavenging.

The continuous supply of high pressure air to passage 11 eliminates the usual gas valve and prevents waste and backfiring as described. More importantly, however, it permits the automatic adjustment of the best air/fuel ratio for all conditions of operation and supplies that admixture to all the cylinders. Each of these advantages is obtained without sacrificing the other.

While the invention has been illustrated for a four stroke cycle engine, it is equally adaptable to a two stroke cycle engine and to any size multi-cylinder engine.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A fuel control system for a gas fueled internal combustion engine having a cylinder head and an inlet valve therein, a passage in the cylinder head leading to said valve, means to supply to the passage at a predetermined pressure a combustible admixture having a predetermined air-fuel ratio, and independent means to provide a continuous supply of air to the passage at a pressure higher than the predetermined pressure at which such combustible admixture is supplied, whereby said air forces the combustible admixture away from the valve, when the latter is closed, and advances through the inlet valve, when the latter is open, to scavenge the combustion chamber.

2. A fuel control system, according to claim 1, in which the continuous supply of air is supplied to the passage adjacent the inlet valve.

3. A fuel control system, according to claim 1, in which the continuous supply of air is throttled into the passage.

4. A fuel control system, according to claim 1, in which the continuous supply of air is throttled into the passage adjacent the inlet valve.

5. A fuel control system, according to claim 1, in which the continuous supply of air is supplied to the passage at a rate less than the rate of flow of said combustible mixture.

References Cited in the file of this patent
UNITED STATES PATENTS 1,746,309      Herier                 Feb. 11, 1930